July 19, 1955 W. L. GERRANS 2,713,219
ROLL-OVER SCOOP TYPE CHECK BLOCKER
Filed Aug. 21, 1950 4 Sheets-Sheet 4

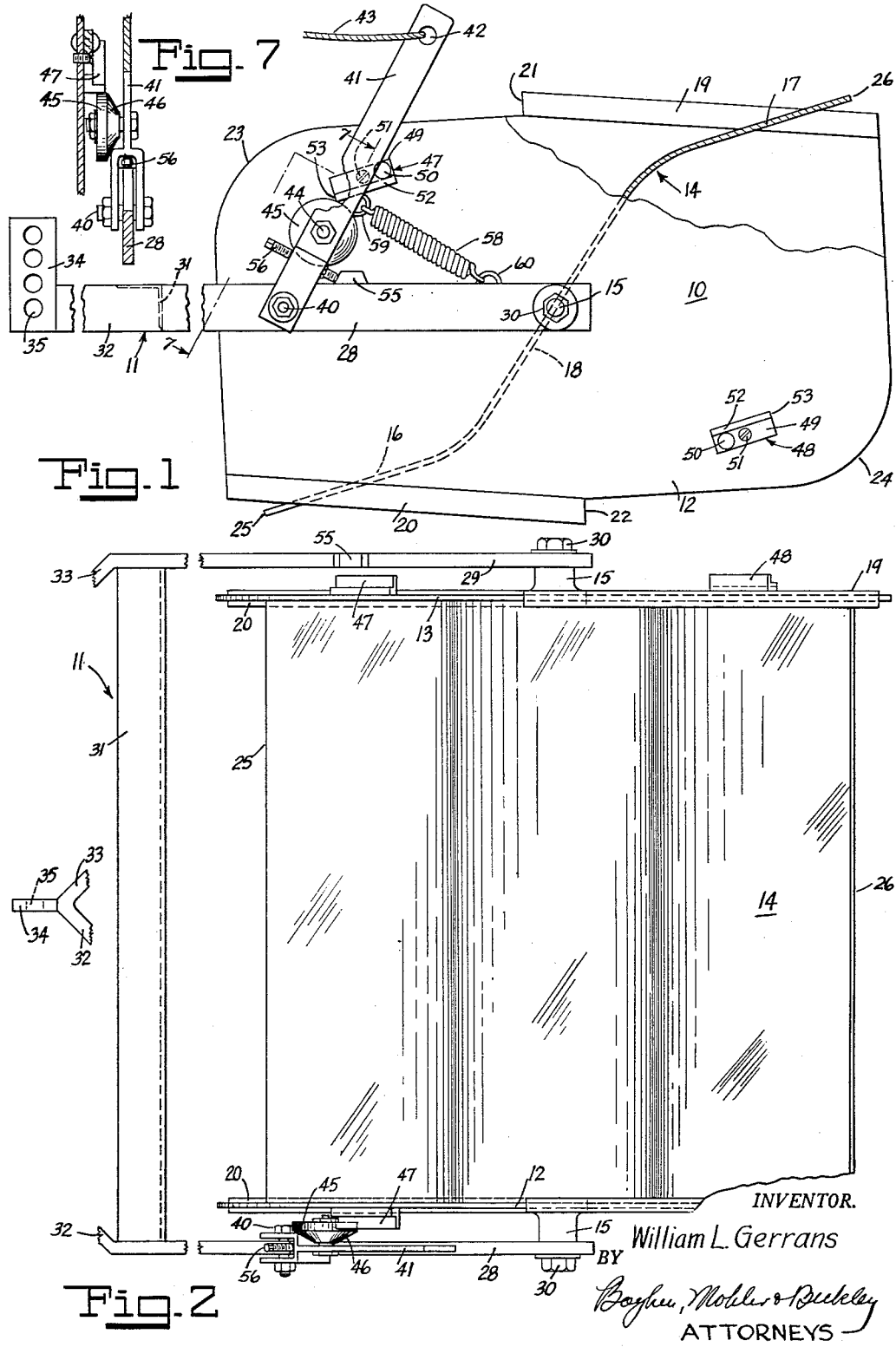
July 19, 1955     W. L. GERRANS     2,713,219
ROLL-OVER SCOOP TYPE CHECK BLOCKER
Filed Aug. 21, 1950     4 Sheets-Sheet 1
INVENTOR.
William L. Gerrans
BY
Boyken, Mohler & Buckley
ATTORNEYS

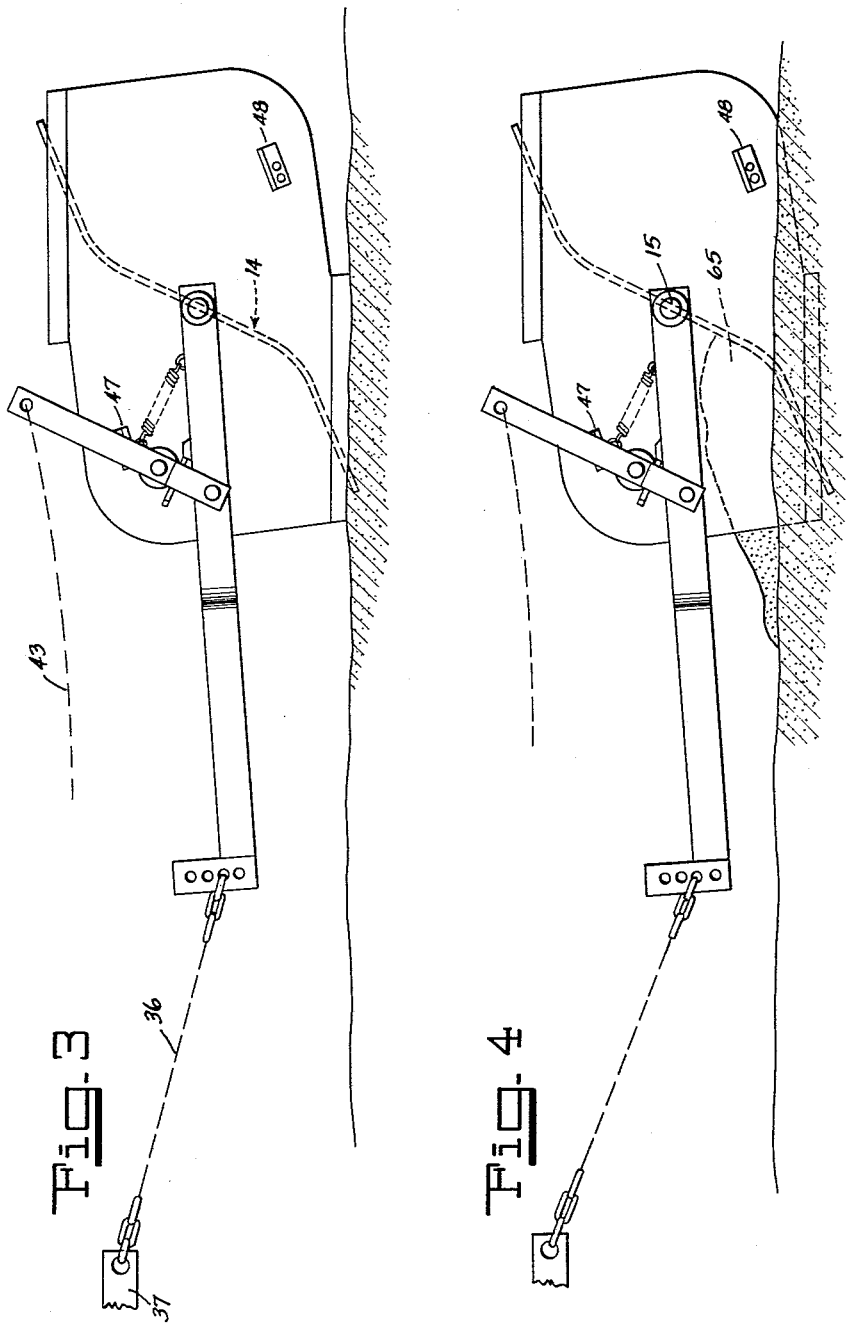

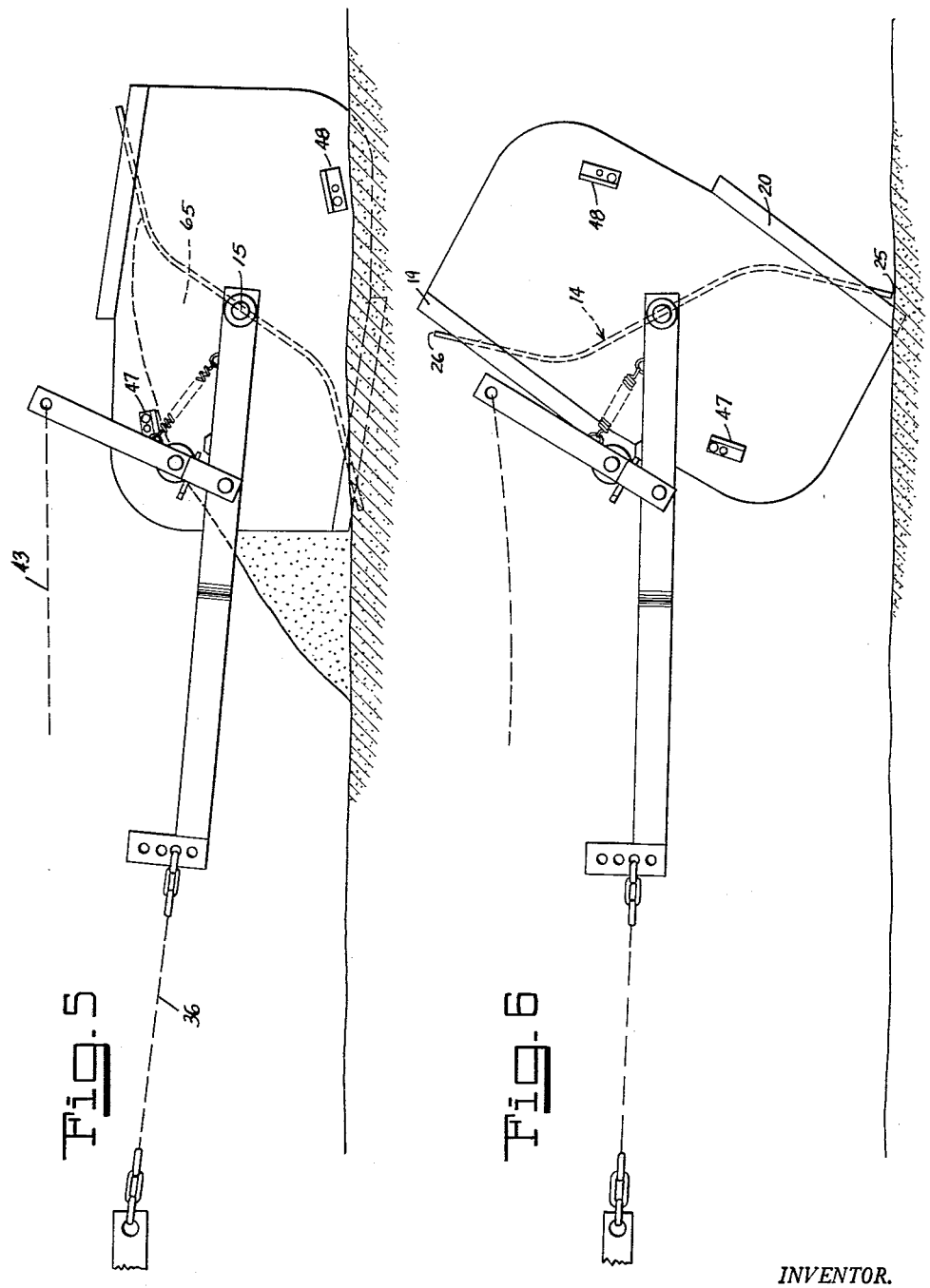

INVENTOR.
William L. Gerrans
BY
Boyken, Mohler + Beckley.
ATTORNEYS

# United States Patent Office 2,713,219
Patented July 19, 1955

2,713,219

ROLL-OVER SCOOP TYPE CHECK BLOCKER

William L. Gerrans, Saratoga, Calif.

Application August 21, 1950, Serial No. 180,605

5 Claims. (Cl. 37—140)

This invention relates to a check blocker and has for one of its objects the provision of a check blocker that is adapted for economically and easily blocking irrigation checks or for back filling during ridging operations, in places where heretofore such operations have been quite costly and difficult.

Another object of the invention is the provision of an implement adapted to dig, move and dump earth in less space and more efficiently than heretofore has been possible.

A still further object of the invention is the provision of an implement or check blocker that is adapted to automatically load with earth upon its movement over the ground and to automatically cease loading when filled.

An added object is the provision of improved means in a check blocker for releasing the same, when loaded, for dumping the load.

Another object is the provision of a simple, and more rugged check blocker than heretofore that is adapted to be actuated for dumping its load from a trip device that is positioned at one side or the other of the bucket thereby facilitating the use of the blocker in places where heretofore its use has been either impossible or quite difficult.

A check blocker is on the order of a load carrying earth scraper in which a load supporting body or bucket is provided that will fill with earth upon movement in one direction over the ground. When desired, the operator pulls a trip cord that is connected with a tripping mechanism on the blocker and the latter will automatically dump its load. Such implements are sometimes known as ridge blockers. Usually they follow a ridging implement that forms ridges and the blocker is used to deposit earth into the openings created by the ridge forming machine where it intersects a previously formed ridge during contour or square ridging etc. Many of the ridges that are intersected and cut through are so close together that with ordinary check blockers it is impossible for the bucket to dump at one ridge opening, return to loading position and collect a load for filling the cut out section of the next ridge. With the present check blocker the bucket is operable for refilling immediately after dumping each load, which makes possible the filling of openings in closely spaced ridges that could not be filled were it necessary to return the bucket to its original position before dumping in order to pick up another load.

Also in prior check blockers, the tripping mechanisms have been so constructed as to make easy and instantaneous release of the bucket for dumping impossible, or which mechanisms quickly become impossible to easily and quickly operate soon after use.

With the present invention a very light pull on the trip cord or trip arm will effect an instantaneous release of the bucket, and this ease of operation will continue irrespective of the character or condition of the soil.

Many other objects and advantages are in the present check blocker as will appear in the specification and in the drawings, such as a structure that automatically controls cutting, and a structure that prevents injury to the bucket in the event obstacles are encountered, and a structure that enables check blocking closer to trees than heretofore without likelihood of injury.

In the drawings:

Fig. 1 is a part sectional part elevational side view of the check blocker, certain parts being broken out to accommodate the view to the sheet.

Fig. 2 is a top plan view of the implement of Fig. 1.

Figure 8:
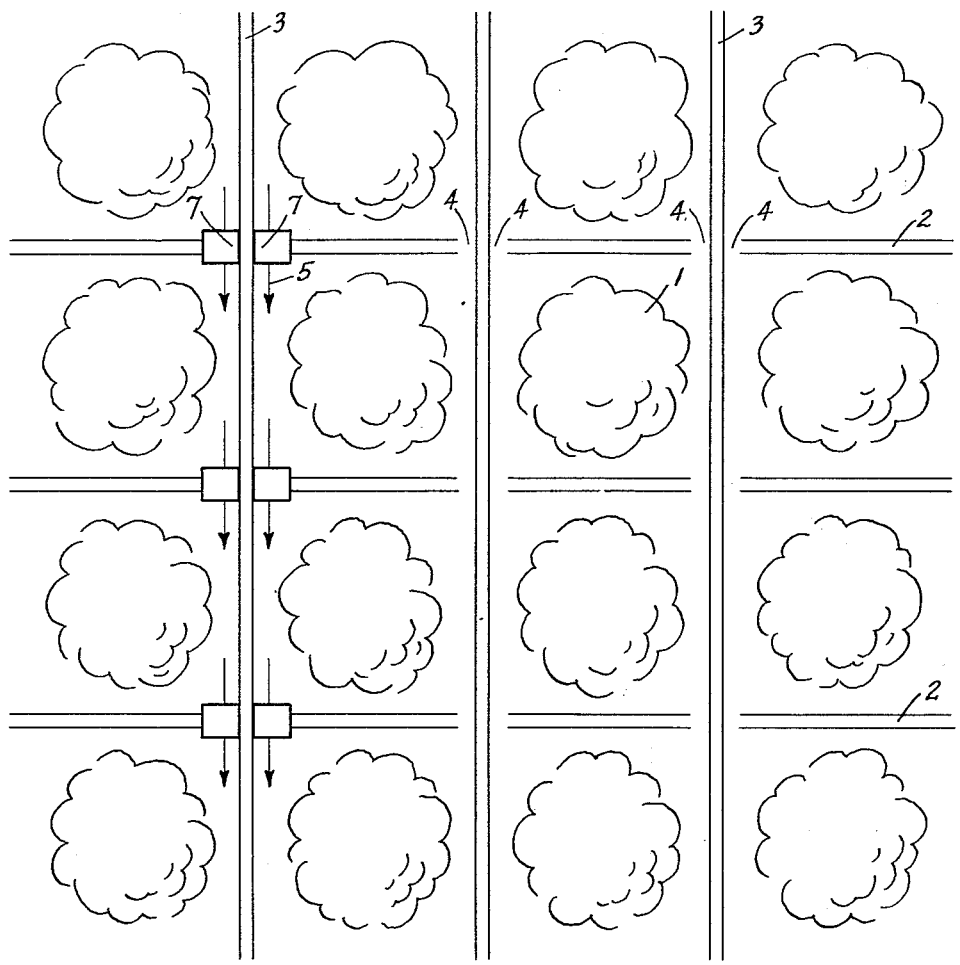

Figs. 3, 4, 5, and 6 are semi-diagrammatic side elevational views showing successive stages in a loading and dumping operation, the ground being indicated in section.

Fig. 7 is a fragmentary sectional view taken substantially along line 7—7 of Fig. 1.

Fig. 8 is a diagrammatic view illustrating one method of check blocking.

One manner of check blocking in an orchard where the ground is level is seen in Fig. 8 in which the trees 1 are indicated in rows. In irrigating these trees, it is desirable to form a ridge around each tree to hold the water. A ridging implement is usually drawn by a tractor between the rows to form ridges 2 that extend in one direction, which ridging implement may be gangs of discs arranged to draw earth from the sides into a ridge, or convergently extending blades may be used with the divergent ends leading and the convergent ends trailing. Irrespective of what implement is employed, when the transverse ridges 3 are formed, the ridger will cut through ridges 2 at opposite sides of ridges 3 forming openings 4 in ridges 2. These must be filled, and a check blocker is employed to do this. Such blocker will travel along paths such as indicated by the arrows 5, and between adjacent pairs of ridges 2 earth will be picked up for dumping at points 7 to fill the openings 4, thus blocking the checks.

Wherever the ridger intersects a previously formed ridge, the openings formed in the latter ridge by the ridges must be filled.

Referring to Figs. 1, 2, the ridge blocker of the present invention comprises a body or bucket generally designated 10 having a drawbar 11 secured thereto for pulling said body over the ground by any suitable source of power, such as a tractor.

The bucket itself comprises a pair of horizontally spaced, horizontally extending, opposed, generally oblong side plates 12, 13. A load carrying plate 14 perpendicular to said side plates rigidly connects them and extends generally diagonally across the opposed sides of said side plates from one pair of their corresponding corners, such as their lower forward corners, to the diagonally opposite pair of corresponding corners, which would be the upper rear corners.

The words "forwardly," "rearwardly," and any words of similar meaning, are used with respect to the direction of travel of the body or bucket 10 when it is pulled in one direction by the drawbar 11.

A pair of coaxial, horizontal pivots 15 are secured on the opposite outwardly facing sides of side plates 12, 13 at their centers.

The load carrying plate 14 is preferably formed from a single sheet of metal, and is so formed as to provide a forward portion 16, rear portion 17 and a central portion 18. The forward and rear portions are inclined relative to horizontal and are in parallel planes and said portions are of the same size, while the central portion 18 is at a slightly greater incline relative to horizontal than the incline of the forward and rear portions. For example, the forwad and rear portions may be at an angle of say from about 15 to 20 degrees relative to horizontal, while the central portion may be from about 50 to 60 degrees relative to horizontal. The designation "horizontal" refers to a plane perpendicular to one vertically bisecting the side plates through the axis of pivots 15, it being understood that the angle between the said portions and the earth or a true horizontal plane will vary as the bucket swings on pivots 15, as will later be described.

The junctures between the portions 16, 17, 18 are preferably curved, as best seen in Fig. 1 and the said load carrying plate may be welded to the side plates at spaced points that are at the upper and lower edges of the side plates and at the edges of said load carrying plate at the curved junctures between portions 16, 17, 18. This form of said load carrying plate and the points of securement to the side plates provides an extremely strong structure resistant to deformation of the bucket and plates under extremely severe use.

The upper and lower edges of the side plates 12, 13 have straight, parallel, skids or runners 19, 20 respectively welded thereto. The runners 19 extend forwardly from the rear upper corners of the side plates while the runners 20 extend rearwardly from the lower forward corners. The runners 19, 20 extend across and slightly past the vertical plane that bisects the bucket 10 through the axis of pivots 15 and the forward and rear ends of said runners provide forwardly and rearwardly directed shoulders 21, 22. The upper and lower edges of side plates 12, 13 forwardly of the runners 19 respectively extend downwardly and upwardly at a slight angle relative to said runners, and the upper forward corners and lower rear corners of the side plates are preferably convexly rounded as at 23, 24.

From the foregoing, it will be seen that the bucket 10 is adapted to tilt about the corner of shoulders 22 when runners 20 are lowermost, or to similarly tilt about shoulders 21 when runners 19 are lowermost, as will be explained more in detail later on.

The lower forward portion 16 of the load carrying plate 14 extends below the runners 20 and terminates in a cutting edge 25, that may or may not be sharpened, as desired. In loose dirt sharpening is not essential. This cutting edge is perferably spaced rearwardly of the lower forward corners of side plates 12, 13.

The upper rear portion 17 of the load carrying plate extends above the runners 19 and terminates in a cutting edge 26 that corresponds to edge 25 in its spacing forwardly of the upper rear corners of the side plates 12, 13.

The drawbar 11 may be generally in the form of a yoke having horizontally extending arms 28, 29 that are respectively along the opposite outer sides of the side plates 12, 13. These arms 28, 29 are formed with openings in their rear ends through which the pivots 15 extend and which pivots include nuts 30 that secure said arms on said pivots.

Arms 28, 29 extend forwardly from pivots 15 parallel with each other to points spaced forwardly of the forward edges of side plates 12, 13, where a cross bar 31 connects them. From the ends of cross bar 31 the arms extend convergently forwardly, as at 32, 33 to meeting relationship where they are welded together and to a short vertically upwardly extending plate 34 formed with a vertical row of openings 35. The forward end of the drawbar is adapted to be secured by a chain or flexible coupling 36 to the load pulling member 37 (Fig. 3) of any suitable tractor.

Each of the arms 28, 29 is formed with a corresponding opening at a point spaced substantially forwardly of the axis of pivots 15 and slightly rearwardly of the forward edges of side plates 12, 13 for a pivot pin or bolt 40.

As seen in the drawing, the pivot pin 40 is on arm 28, and in the present invention, it will be on only one arm of the pair. Both arms 28, 29 are identical, hence the pivot pin 40 and any other structure that is separable from arm 28, can be placed on arm 29 instead, if desired. Where the present description specifies arm 28, as the one on which pin 40 and its associated structure is carried, it is to be understood that such structure may in cetain instances be on arm 29 instead.

The pivot 40 pivotally connects the lower end of an upwardly extending trip arm 41 to arm 28. The upper end of said arm 41 is apetured at 42 for a pull cord 43 that is adapted to extend forwardly to an operator on the tractor (not shown).

The lower end of arm 41 may be forked to straddle the arm 28, with both arms of the fork apetured for pivot 40.

Spaced above pivot 40 the arm 41 carries a pivot 44 that projects from the arm 41 toward the side plate 12, and on which pivot is a roller 45. The side 46 of roller 45 adjacent arm 41 is tapered in directions toward said arm. By this structure any dirt that might lodge between the roller and the arm will be quickly dislodged upon a slight rotation of the roller.

Secured on the side plate 12 at points equally spaced radially from the axis of pivots 15 and at opposite sides of said axis are a pair of stop elements 47, 48, and here again, it is pointed out that identical elements are on plate 13 in the same positions as they are on plate 12.

Each stop element is preferably a short angle piece, one leg 49 of which is secured to side plate 12 by a pivot pin 50 and by a shear pin 51 spaced longitudinally of said leg. The other leg 52 of each stop element projects outwardly of the side plate 12.

Inasmuch as stop elements 47, 48 are equally spaced from the axis of the pivots 15 on which the bucket 10 is revolvable, it will be seen that they will revolve about said axis in the same path. Said stop elements are respectively adjacent the curved corners 23, 24 of the bucket and they are longitudinally so inclined that one end edge 53 of each element will engage the periphery of the roller 45 at the side of said roller opposite the pivot 40 of said trip arm upon each 180 degree revolution of the bucket when the forward end of the bucket is swung downwardly. This engagement between the end edge 53 and the roller is preferably a line engagement along one corner of the end edge. The engagement between said end edge 53 and the roller is at a point spaced radially of the axis of pivots 15 a very slight distance outwardly of a straight line extending through the axes of pivots 40, 44 of the trip arm 41 and roller 45, and where such latter arm intersects the periphery of said roller at the side remote from pivot 40.

The edge 53 of the leg 52 of element 47, which is the one shown in Fig. 1 in actual engagement with the roller 45, is the leading edge of said element. Said leg extends slantingly upwardly and rearwardly, as seen in Fig. 1 relative to its leading end, and the pivot pin 50 is adjacent the trailing edge, while the shear pin 51 is forwardly of pin 50 and nearer the leading edge. Upon revolution of the bucket through 180 degrees, the stop elements 47 would be in interchanged relation to element 48, and all other parts of the bucket would also be in interchanged relationship.

Rigid with arm 28 (and the same is true of arm 29) is a stop member 55. This member is adapted to be engaged by one end of an adjustable screw 56 that threadedly extends between the legs of the lower yoke end of trip arm 41, the said arm being threadedly apertured for said screw.

A tension helical spring 58 is connected at one end with an eye 59 on the rear edge of trip arm 41 at a point spaced above screw 56, and the opposite end of said spring is secured to an eye 60 secured on the upper edge of the arm 28 at a point forwardly of but adjacent the pivot 15. Thus the spring 58 will yieldably hold the end of screw 56 against stop 55 and limit the rearward upper movement of the trip arm 41 to a position in which the roller 45 is properly in engagement with the stop element 47 (or 48 as the case may be).

From the foregoing description, it will be seen that the bucket, as seen in Figs. 1, 3 to 5 inclusive, cannot rotate relative to the drawbar 11 in a counterclockwise direction, which is the direction in which it tends to rotate at all times, unless the roller 45 is moved forwardly a sufficient distance to permit the roller engaging end edge of the element 47 to move past the roller. This means that the point of intersection of the periphery of roller 45 at the side of the roller adjacent edge 53 by a straight line extending through the axes of pivots 40, 44 must be moved very slightly in direction away from the axis 15 and past the point of engagement of roller 45 with edge 53. As soon as this movement is accomplished by the operator on the tractor pulling on the trip cord 43, the bucket will rotate counterclockwise to dump the load. At the same time the roller 45 will be rotated, thus clearing the same of any dirt that might otherwise tend to make the roller stick.

The adjusting screw 56 enables the trip lever to be correctly adjusted so that the roller will be in a position to hold the bucket, but only a slight effort will be required to release the trip arm.

In operation, the view in Fig. 3 shows the bucket at the beginning of a filling operation, and it will be noted that the forward cutting edge of the load carrying plate 14 is in a position to dig into the earth.

Fig. 4 shows the bucket as the load 65 of earth starts to pile up in the bucket ahead of the pivot 15. All of the load is ahead of the pivot, and tends to keep the cutting edge of the load carrying plate in digging relation to the ground.

In Fig. 5, it will be seen that the load 65 has moved rearwardly past the pivot 15. The combined weight of the load and the degree of upward pull on the flexible coupling 36 results in the forward end of the bucket being elevated and a slight additional load in the bucket will result in the forward end of the load carrying plate being raised out of the ground, at which point the forward end of the bucket will tilt upwardly about the rear end of the runners as a fulcrum, when no further digging will be effected. However, the main load is still forward of the pivots 15 and all that prevents the bucket from rotating counterclockwise (as seen in the drawings) is the engagement between the roller 45 and stop element 47.

As soon as the load is where it is to be dumped, a slight jerk on the cord 43 will permit stop 47, shown in Fig. 1, to move past roller 45 and thereby release the bucket to rotate through 180 degrees, and the stop element 48 will then engage the roller to hold the bucket in correct position for the next filling operation. However, the load carrying plate is now reversed so that edge 26 is the leading edge and is lowermost. Also the runners 19, 20 are in interchanged position. As soon as the bucket is reloaded, the load may again be dumped in the manner already described, and again the bucket will be revolved through 180 degrees. This successive rotation of the bucket in 180 degree movements will continue with successive loadings of the bucket.

Inasmuch as the bucket will quickly load with sufficient earth to block the checks, it will be seen that the bucket is adapted for use where the ridge openings are so close together that sufficient earth could not be loaded, were it necessary to swing the bucket back in reverse direction after each dumping of the load, to reload the same. Also, in the present instance, if the ridge openings are quite far apart, the bucket will not continue to dig into the earth after it is loaded, but will merely slide along the ground until it reaches the point where it is to be dumped.

By placing the bucket tripping mechanism at one side or the other of the bucket, the latter may be drawn quite close to trees, etc. without injury to the bucket or to the trees, since the mechanism can be positioned on the side of the bucket that is away from the row of trees. Also, the trip cord can be placed at the side most convenient for the operator on the tractor.

The placing of the tripping mechanism on one side only, including the roller, is made possible by use of the shear pin 51. For example, were the forward lower corner of the bucket that is opposite the side on which the tripping mechanism is positioned to strike a root, stump, large rock or other unusual obstacle, the bucket and drawbar arms could be sprung out of shape or out of proper relation to each other, unless the bucket were released. The shear pin enables the bucket to be released, thereby completely eliminating the possibility of injuring the bucket and drawbar arms.

Insofar as the present invention is concerned, it will operate equally well in hard or soft earth by reason of the projecting cutting edge of the earth carrying plate and the angle of the end portions of said plate. This angle of the load carrying plate is important in that too steep an angle for the central portion will not enable the load to be so distributed that the cutting will stop when the bucket is loaded, and if the angle is not steep enough, too much of the load will pass the central axis, with the result that the load cannot be dumped by actuation of the trip arm. The stop element 47 or 48 must always tend to move past the roller in order to result in a quick dumping of the load by movement of the roller out of holding engagement with the stop element.

I claim:

1. In a check blocker having a load supporting body adapted for movement over the ground in one direction and which body includes a pair of similar, horizontally spaced, opposed, coaxial side plates and a load carrying plate rigidly connecting said side plates having a cutting edge adjacent the forward side of said body relative to said direction of travel; a drawbar having a pair of arms at opposite outer sides of said side plates, coaxial pivots securing said side plates to said arms for rotation of said body in one direction to dump a load supported on said load carrying plate, a stop member rigid with one of said side plates and radially spaced from the axis of said pivots for revolving in a circularly extending path upon revolution of said body, a roller, a trip arm, a trip arm pivot swingably securing said trip arm at one end thereof to one arm of said drawbar, a shaft supporting said roller on said trip arm for rotation of said roller on its axis, means for holding said trip arm in a position in which said stop member engages said roller at a point on the side of the latter remote from said one arm to obstruct rotation of said body, said point being spaced radially outwardly of the axis of said pivots a slightly greater distance than the point of intersection between a straight line and the side of said roller as that engaged by said stop member and which line extends through the axis of said shaft and the pivot of said trip arm whereby movement of said trip arm through the distance between said points in direction generally radially outwardly of the axis of said pivots will release said body for rotation in said one direction.

2. In a check blocker having a load supporting body adapted for movement over the ground in one direction and which body includes a pair of similar, horizontally spaced, opposed, coaxial side plates and a load carrying plate rigidly connecting said side plates having a cutting edge adjacent the forward side of said body relative to said direction of travel; a drawbar having a pair of arms at opposite outer sides of said side plates, coaxial pivots securing said side plates to said arms for rotation of said body in one direction to dump a load supported on said load carrying plate, a stop member rigid with one of said side plates and radially spaced from the axis of said pivots for revolving in a circularly extending path upon revolution of said body, a roller, a trip arm, a trip arm pivot securing one end of said trip arm to one arm of said drawbar, a shaft supporting said roller on said trip arm for rotation of said roller on its axis, means for holding said trip arm in a position in which said stop member engages said roller at a point on the side of the latter remote from said one arm to obstruct rotation of said body, said point being spaced radially outwardly of the axis of said pivots a slightly greater distance than the point of intersection between a straight line and the side of said roller as that engaged by said stop member and which line extends through the axis of said shaft and the pivot of said trip arm whereby movement of said trip arm through the distance between said points in direction generally radially outwardly of the axis of said pivots will release said body for rotation in said one direction, the axes of said shaft and of the pivot for said trip arm being parallel with the axis of said pivots, one side of said roller being opposed and adjacent to one side of said trip arm and said one side of said roller being tapered axially outwardly from its periphery toward the side of the trip arm adjacent thereto to facilitate dislodgement of dirt that may fall between said roller and said trip arm.

3. In a check blocker having a load supporting body adapted for movement over the ground in one direction and which body includes a pair of similar, horizontally spaced, opposed, coaxial side plates and a load carrying plate rigidly connecting said side plates having a cutting edge adjacent the forward side of said body relative to said direction of travel; a drawbar having a pair of arms at opposite outer sides of said side plates, coaxial pivots securing said side plates to said arms for rotation of said body in one direction to dump a load supported on said load carrying plate, a stop member rigid with one of said side plates and radially spaced from the axis of said pivots for revolving in a circularly extending path upon revolution of said body, a roller, a trip arm, a trip arm pivot swingably securing said trip arm at one end thereof to one arm of said drawbar, a shaft supporting said roller on said trip arm for rotation of said roller on its axis, means for holding said trip arm in a position in which said stop member engages said roller at a point on the side of the latter remote from said one arm to obstruct rotation of said body, said point being spaced radially outwardly of the axis of said pivots a slightly greater distance than the point of intersection between a straight line and the side of said roller as that engaged by said stop member and which line extends through the axis of said shaft and the pivot of said trip arm whereby movement of said trip arm through the distance between said points in direction generally radially outwardly of the axis of said pivots will release said body for rotation in said one direction, means for limiting the degree of swing of said roller generally in direction toward the axis of said pivots including an element on said trip arm and a stop on said one arm of said drawbar engageable with said element, and a spring connecting said trip arm with said one arm of said drawbar for yieldably holding said element and said stop in engagement.

4. In a check blocker having a load supporting body adapted for movement over the ground in one direction and which body includes a pair of similar, horizontally spaced, opposed, coaxial side plates and a load carrying plate rigidly connecting said side plates having a cutting edge adjacent the forward side of said body relative to said direction of travel; a drawbar having a pair of arms at opposite outer sides of said side plates, coaxial pivots securing said side plates to said arms for rotation of said body in one direction to dump a load supported on said load carrying plate, a stop member rigid with one of said side plates and radially spaced from the axis of said pivots for revolving in a circularly extending path upon revolution of said body, a roller, a trip arm, a trip arm pivot securing one end of said trip arm to one arm of said drawbar, a shaft supporting said roller on said trip arm for rotation of said roller on its axis, means for holding said trip arm in a position in which said stop member engages said roller at a point on the side of the latter remote from said one arm to obstruct rotation of said body, said point being spaced radially outwardly of the axis of said pivots a slightly greater distance than the point of intersection between a straight line and the side of said roller as that engaged by said stop member and which line extends through the axis of said shaft and the pivot of said trip arm whereby movement of said trip arm through the distance between said points in direction generally radially outwardly of the axis of said pivots will release said body for rotation in said one direction, means for limiting the degree of swing of said roller generally in direction toward the axis of said pivots including an element on said trip arm and a stop on said one arm of said drawbar engageable with said element, and a spring connecting said trip arm with said one arm of said drawbar for yieldably holding said element and said stop in engagement, means supporting said element on said trip arm for movement toward and away from said stop for varying the degree of swing of said roller.

5. In a check blocker having a load supporting body adapted for movement over the ground in one direction and which body includes a pair of similar, horizontally spaced, opposed, coaxial side plates and a load carrying plate rigidly connecting said side plates having a cutting edge adjacent the forward side of said body relative to said direction of travel; a drawbar having a pair of arms at opposite outer sides of said plates, coaxial pivots securing said side plates to said arms for rotation of said body in one direction to dump a load supported on said load carrying plate, a stop member rigid with one of said side plates and radially spaced from the axis of said pivots for revolving in a circularly extending path upon revolution of said body, a roller, a trip arm, a trip arm pivot securing one end of said trip arm to one arm of said drawbar, a shaft supporting said roller on said trip arm for rotation of said roller on its axis, means for holding said trip arm in a position in which said stop member engages said roller at a point on the side of the latter remote from said one arm to obstruct rotation of said body, said point being spaced radially outwardly of the axis of said pivots a slightly greater distance than the point of intersection between a straight line and the side of said roller as that engaged by said stop member and which line extends through the axis of said shaft and the pivot of said trip arm whereby movement of said trip arm through the distance between said points in direction generally radially outwardly of the axis of said pivots will release said body for rotation in said one direction, the other arm of said drawbar being formed with an opening for receiving the pivot of said trip arm and said pivot being removable from said one arm for transferring the trip arm and said pivot to said other arm, and a stop member rigid with the other side plate of said pair positioned to releasably engage the roller on said trip arm when said trip arm is transferred to said other arm of said drawbar whereby said trip arm may be positioned for a right or left handed operator as desired.

References Cited in the file of this patent
UNITED STATES PATENTS

| | | |
|---|---|---|
| 6,918 | Crafts et al. | Dec. 4, 1849 |
| 132,549 | Thomson | Oct. 29, 1872 |
| 629,452 | Lovejoy | July 25, 1899 |
| 765,231 | Ellis | July 19, 1904 |
| 1,207,146 | Dickinson | Dec. 5, 1916 |
| 1,924,359 | Harrison | Aug. 29, 1933 |
| 2,158,340 | Spieth | May 16, 1939 |
| 2,337,620 | Peacock | Dec. 28, 1943 |
| 2,534,972 | Hume | Dec. 19, 1950 |
| 2,587,487 | Koop | Feb. 26, 1952 |